(No Model.) 2 Sheets—Sheet 2.
A. EDWARDS.
MERCURY SEAL TRAP FOR LAVATORIES, BATH TUBS, &c.
No. 287,369. Patented Oct. 23, 1883.
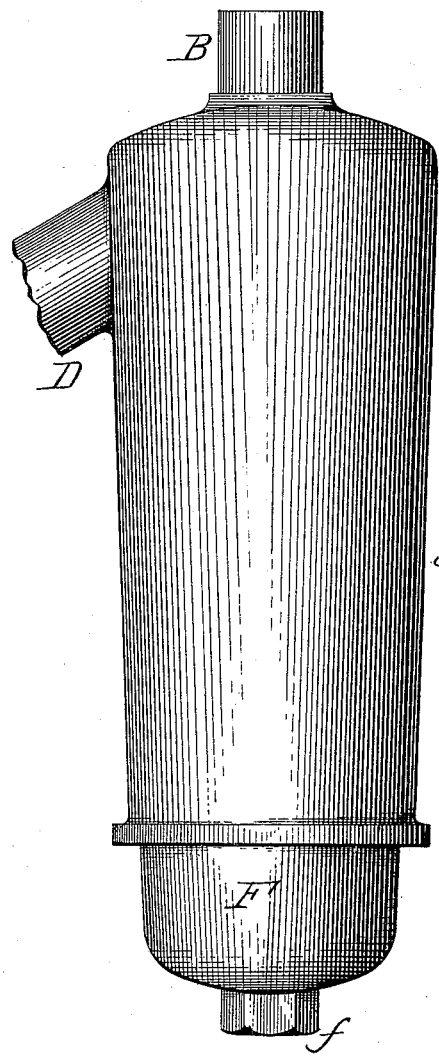
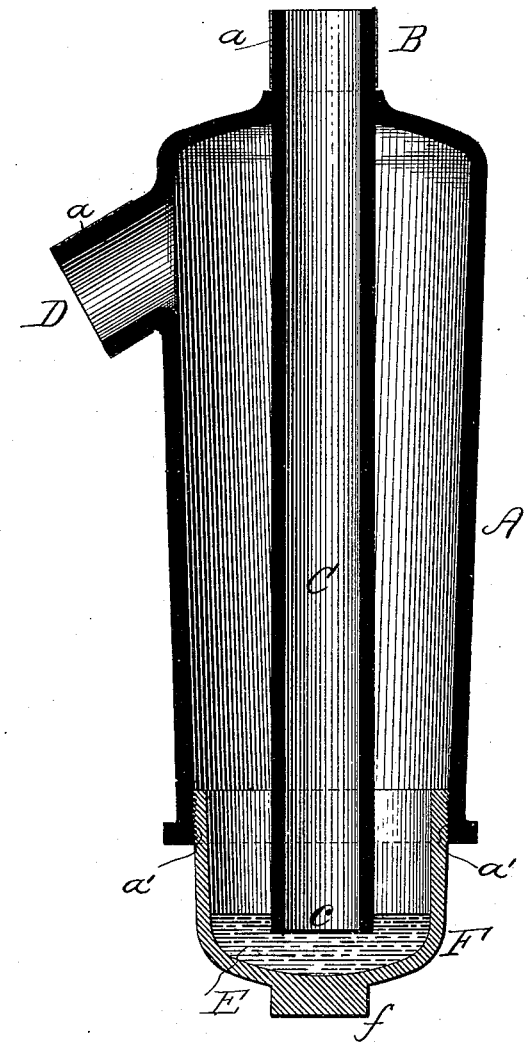

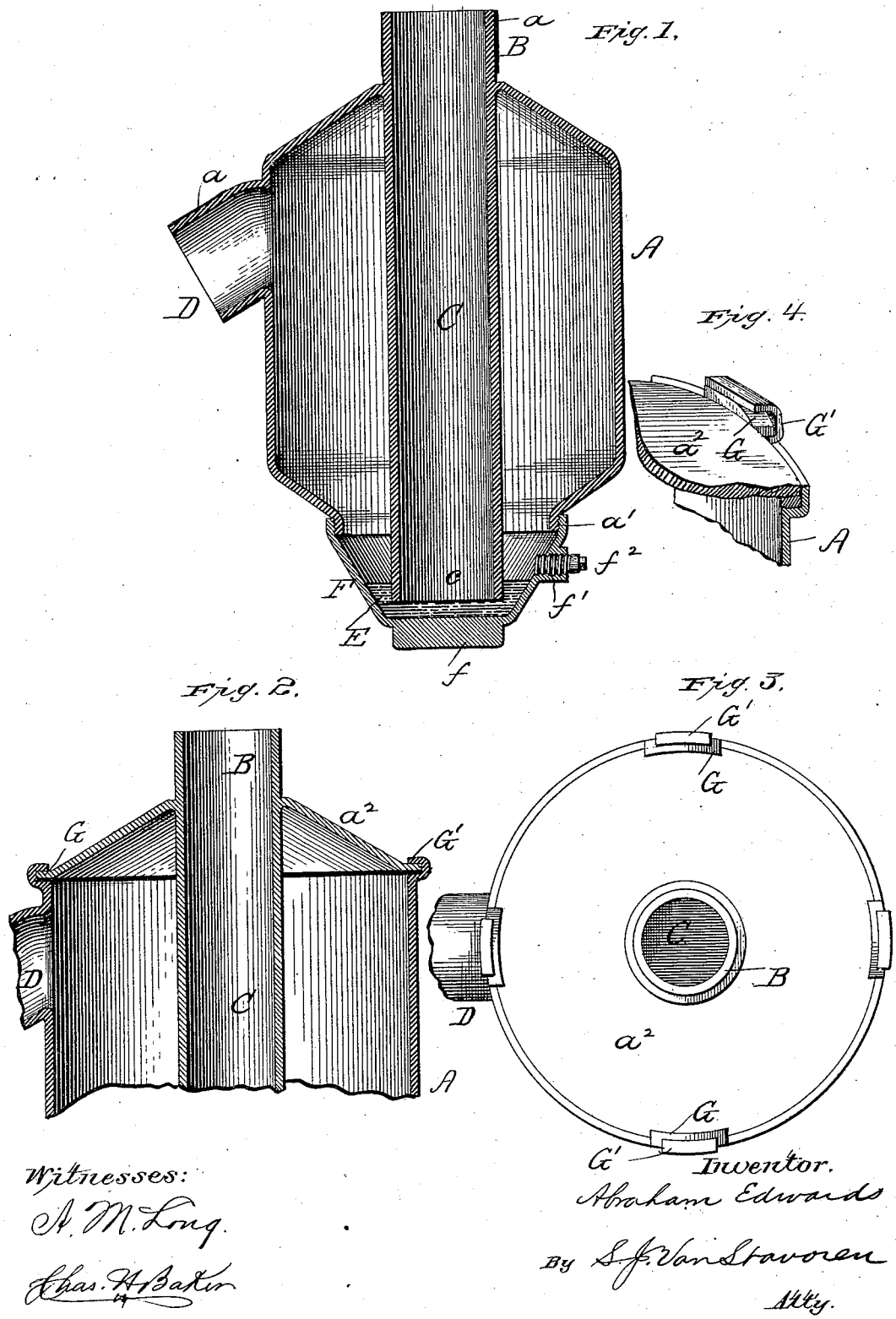

UNITED STATES PATENT OFFICE.

ABRAHAM EDWARDS, OF ASBURY PARK, NEW JERSEY.

MERCURY-SEAL TRAP FOR LAVATORIES, BATH-TUBS, &c.

SPECIFICATION forming part of Letters Patent No. 287,369, dated October 23, 1883.

Application filed February 10, 1883. (No model.)

*To all whom it may concern:*

Be it known that I, ABRAHAM EDWARDS, a citizen of the United States, residing at Asbury Park, in the county of Monmouth and State of New Jersey, have invented certain new and useful Improvements in Mercury-Seal Traps for Lavatories, Bath-Tubs, &c., of which the following is a specification, reference being had therein to the accompanying drawings, wherein—

Figure 1 is a vertical transverse section of a mercury-seal trap embodying my invention. Fig. 2 is a broken section of a modified form of construction. Fig. 3 is a plan of the same. Fig. 4 is a detail broken perspective, and Figs. 5 and 6 are respectively an elevation and vertical section of the simplest form of my improved trap.

My invention has relation to mercury-seal traps, and has for its object to provide a simple and inexpensive trap, the component parts of which are readily finished or put together, and which not only excludes or bars the escape of sewer-gas therefrom, but also serves to destroy all plant life or fungus growth finding its way into or originating in the trap.

It is well known that in all soil-pipes there is more or less growth of low vegetable organisms which gradually creep along the inner walls until they penetrate within the seal attached to said pipes, and pass off into and float in the air of the apartments wherein the outlets of said pipes are located, to become disease-germs for producing diphtheria, typhoid fever, &c. It is highly important, therefore, in providing seal-traps for wash-basins and other fixtures that the seals of the traps should be so constructed and composed of such materials that they will completely stop the movement of such growth and effectually destroy such organisms when they attempt to penetrate therethrough.

The most recent investigations have shown that the oxides or bichlorides of mercury or similar compounds are the most powerful agents at our command for preventing or destroying the growth of the described class of vegetable organism to which the disease-germs belong. I have discovered that mercury placed in a cast-iron trap gradually oxidizes or is changed to oxide of mercury, which, if the inner walls or surfaces of the trap be unglazed, accumulates thereon both above and below the seal, forming a coating or film which is poisonous to plant life. The more extensive the inner surfaces of the trap the greater will be the extent of the poisonous film therein, and the better the protection against the disease-germs. The gradual absorption of the mercury to form the oxide necessitates its occasional replenishment. It is essential, therefore, that the trap be so constructed that the renewal of the mercury may be easily and quickly made without uncoupling it from its pipe-connections.

To the end therefore of providing a large extent of surface within the trap for the accumulation of the poisonous film, and to effect an easy and quick replenishment of the mercury, my invention consists of the novel construction, combination, and arrangement of parts comprising a mercury-seal trap, as hereinafter more particularly described and claimed.

Referring to the accompanying drawings, A represents the body of the trap, which is made of unusual length, as plainly shown in Figs. 5 and 6, to provide increased area of surface within the same for the accumulation of the film of oxide of mercury, as above explained. Said body is made of cast-iron, and the induction-pipe B and eduction-pipe D are preferably cast integral therewith, as shown in Figs. 1, 5, and 6. The end of the induction-pipe B projects downwardly into the body A, as shown at C, the end c of which is designed to be sealed in mercury, as hereinafter explained.

The bore of the induction and eduction pipes may be the same; but I prefer to make that of the latter somewhat larger than that of the former, in order to prevent liability of siphoning the mercury out of the trap.

The coupling ends of the induction and eduction pipes are coated with tin or other suitable material, as indicated at a, Figs. 1 and 6, so as to make a solder-joint with the pipes to which the trap is to be connected.

The lower end of body A is bottomless, and is provided with threads a', located either on the interior or exterior thereof, into which is screwed a chamber or cup, F. In the latter is placed the mercury (represented at E) for sealing the end $c$ of pipe B. The cup F is also made of cast iron, and provided with a projecting lug or nut, $f$, by means of which it may readily be unscrewed from body A or firmly secured thereto to make an air-tight joint therewith.

If desired, a small opening, $f'$, may be made in the wall of cup F, in which is inserted a screw or other stopple, $f^2$, to provide a lateral cleaning-out or inspection opening for the trap. Such opening is designed to be principally used in large-sized traps, as shown in Fig. 1, or where it is not desirable to remove the cup F, except to supply fresh mercury to the trap. Said cup is of less diameter or area in cross-section than that of the body A, in order to reduce the dimensions of the sealing-chamber and lessen the quantity of mercury required for effecting the seal. So, too, if desired, the body A may be separate from the induction and sealing pipes, in which case the latter, with the top $a^2$ of the trap, will be formed integral with each other and screwed or connected to said body by means of inclined lugs and lips G and G', respectively, as represented in Figs. 2, 3, and 4; or other suitable means for making such connection may be employed.

The operation is as follows: The waste fluid from the basin or other fixture to which the trap is affixed passing into pipe B exerts a hydrostatic pressure to depress and move the mercury away from the end $c$ of said pipe, thereby forming an outlet for the escape of such fluid to the eduction-pipe D, whereupon the mercury returns to its level and seals the pipe B or its depending end C, and excludes the entrance of sewer-gas or other odors thereto. As the mercury gradually oxidizes it accumulates on all the inner surfaces of the trap or body A, and also lines the induction and eduction pipes with a film or covering of the oxide. The latter being poisonous to plant life, it follows that all vegetable organism creeping into the body A or the trap will be destroyed thereby. The extent of such film being exceedingly large, the destruction of the fungus growth is more effectual and assured. It will be seen, therefore, that the special advantages of the above-described trap are its simplicity of construction, and the gradual oxidation of the mercury, and the increased area or surface exposed for the accumulation of the oxide upon the inner unglazed surfaces. It therefore affords an important additional protection against the disease-germs, which creep along the soil-pipe and endeavor to penetrate within the trap to vitiate its value as a safeguard against sewer diseases. The mercurial compound poisonous to plants is automatically supplied to the trap or produced therein at the point where it is most needed, and proves to be a most important means of protection against the diseases and maladies which are disseminated by the agency of sewer-gas.

What I claim is—

1. A mercury-seal trap composed of an elongated body having an induction-pipe, an eduction-outlet, and an open bottom, to which is secured a removable chamber or cup having a diameter or area in cross-section less than that of said body, said parts being made of cast-iron having unglazed inner surfaces, substantially as shown, and for the purpose set forth.

2. A mercury-seal trap composed of a body having an open bottom, induction and eduction pipes, and a removable mercury-chamber having a lateral opening with stopple, substantially as shown and described.

3. A mercury-seal trap composed of a body, A, having an open bottom, induction and eduction pipes, and a mercury-chamber screwed thereto, and provided with a nut, $f$, the diameter or area of said chamber being less than that of body A, substantially as shown and described.

In testimony whereof I affix my signature in presence of two witnesses.

ABRAHAM EDWARDS.

Witnesses:
DAVID HARVEY, Jr.,
ALFRED R. BAILEY.